United States Patent
Broer et al.

[11] Patent Number: 5,712,485
[45] Date of Patent: Jan. 27, 1998

[54] RADIATION-DOSE INDICATOR AND LAMP AND TANNING APPARATUS COMPRISING SUCH A RADIATION-DOSE INDICATOR

[75] Inventors: Dirk J. Broer, Eindhoven, Netherlands; Johannes A. F. Peek, San Pedro Garza Garcia, Mexico; Ingrid E. J. R. Heynderickx, Eindhoven, Netherlands

[73] Assignee: U.S. Philips Corporation, New York, N.Y.

[21] Appl. No.: 652,396

[22] Filed: May 23, 1996

[30] Foreign Application Priority Data

May 23, 1995 [EP] European Pat. Off. .......... 95201343.1

[51] Int. Cl.⁶ ............................................. G01J 1/50
[52] U.S. Cl. ............................................. 250/474.1
[58] Field of Search ................................... 250/474.1

[56] References Cited

U.S. PATENT DOCUMENTS

| | | | |
|---|---|---|---|
| 3,627,699 | 12/1971 | Goldberg et al. | 250/474.1 |
| 3,663,390 | 5/1972 | Fergason et al. | 250/474.1 |
| 3,935,337 | 1/1976 | Taylor | 427/180 |
| 4,863,282 | 9/1989 | Rickson | 250/474.1 |

FOREIGN PATENT DOCUMENTS 883001984  3/1988  European Pat. Off. .

*Primary Examiner*—Carolyn E. Fields
*Attorney, Agent, or Firm*—Ernestine C. Bartlett

[57] ABSTRACT

Radiation-dose indicator as well as a lamp and a tanning apparatus comprising such a radiation-dose indicator.

The invention provides a novel type of radiation-dose indicator which is reliable and accurate. The indicator comprises an optically active layer which includes a liquid-crystalline material as well as a radiation-sensitive compound. This compound is converted under the influence of radiation in such a way as to change the order of the liquid-crystalline material. Preferably, a trans-isomer is used as the radiation-sensitive compound, which is converted to the corresponding cis-isomer under the influence of radiation. In this way, the order of the liquid-crystalline material is broken. Indicators in accordance with the invention can very advantageously be used in UV- and IR-lamps as well as in tanning apparatus.

30 Claims, 3 Drawing Sheets

FORMULA 1

FORMULA 2

FORMULA 3

FORMULA 4

FORMULA 5

FORMULA 6

FORMULA 7

FORMULA 8

FORMULA 9

RADIATION-DOSE INDICATOR AND LAMP AND TANNING APPARATUS COMPRISING SUCH A RADIATION-DOSE INDICATOR

FIELD OF THE INVENTION

The invention relates to a radiation-dose indicator comprising an optically active layer. The invention also relates to a lamp comprising such a radiation-dose indicator. The invention further relates to a tanning apparatus which is provided with such a radiation-dose indicator.

BACKGROUND OF THE INVENTION

Radiation-dose indicators are used in fields of application where it is important to total the amount of radiation of a specific wavelength range as a function of time. This wavelength range may be in the infrared (IR), visible or ultraviolet (UV) portion of the electromagnetic spectrum. Such a measurement may be important to determine the overall useful life of lamps, such as IR- or UV-lamps. By virtue thereof, the time when the lamp should be replaced can be indicated in a simple manner. A radiation-dose meter can also be used in fields of application where people are irradiated to determine the amount of radiation received per individual treatment or per series of treatments.

A radiation-dose indicator of the type mentioned in the opening paragraph is known per se. For example, in the abstract of the published Japanese Patent Application JP 63-160.146 a description is given of a radiation-dose indicator which is provided on a gas-discharge lamp. The operation of the indicator is based on discoloration of colored indicator paper under the influence of radiation. The expected life of the lamp has almost ended when the indicator paper has discolored to such a degree that its color is the same as that of a reference paper.

The known indicator has drawbacks. First of all, the reliability and accuracy of the known indicator are relatively low. This disadvantage is shared by most radiation indicators which are based on a bleaching and/or discoloring action. In addition, a separate reference indicator is necessary.

SUMMARY OF THE INVENTION

It is an object of the invention to provide a radiation-dose indicator which does not have the above disadvantages. The invention more particularly aims at providing a radiation-dose indicator which combines a high reliability with a high accuracy. The indicator in accordance with the invention should also be cheap. The invention further aims at providing a lamp as well as a tanning apparatus which are provided with such a radiation-dose indicator.

These and other objects of the invention are achieved by a radiation-dose indicator of the type mentioned in the opening paragraph, which is characterized in that the optically active layer includes a liquid-crystalline material as well as a radiation-sensitive compound which is converted under the influence of radiation in such a way as to change the order of the liquid-crystalline material.

The invention is based on the insight that by combining radiation-sensitive compounds and liquid-crystalline materials, radiation-dose indicators can be manufactured in a relatively simple and cost-effective manner. Indicators of this type also have a high reliability and a good accuracy.

The operation of the indicators in accordance with the invention is based on the transition between the ordered state and the unordered state of the liquid-crystalline material of the optically active layer. In the ordered or anisotropic state the liquid-crystalline material is opaque, whereas in the unordered or isotropic state the material is optically transparent. This transition can be induced under the influence of radiation-sensitive compounds. These compounds are converted under the influence of radiation. The conversion products of these compounds have such a structure that they change the molecular order of the liquid crystalline material. This change can be, on the one hand, a conversion from the ordered to the unordered state and, on the other hand, a conversion from the unordered to the ordered state. In the former situation the opaque, anisotropic, liquid-crystalline material is converted to transparent, isotropic material after it has received a certain amount of radiation. In the latter situation the transparent, isotropic, liquid-crystalline material is converted to opaque, anisotropic material after it has received a certain amount of radiation.

The time when the indicator changes depends, inter alia, on the sensitivity of the compound to the measured radiation, the concentration of the radiation-sensitive compound in the optically active layer, the type of liquid-crystalline material of the optically active layer, the thickness of the optically active layer, the operating temperature of the inventive indicator and the intensity of the measured radiation. In particular said parameters enable those skilled in the art to construct, in a simple manner, an indicator which is suitable for the intended application.

As stated hereinabove, in principle two types of transitions of the liquid-crystalline material are possible, namely from the unordered state to the ordered state and conversely. In practice it has been found that the transition from the ordered state to the unordered state is easiest to realize. A preferred embodiment of the indicator in accordance with the invention is therefore characterized in that the optically active layer exhibits a liquid-crystalline order which is broken after conversion of the radiation-sensitive compound.

Good results have been achieved with indicators in which the radiation-sensitive compound decomposes under the influence of radiation. Examples of such compounds are tolane compounds whose conformation does not disturb the order of the liquid-crystalline material. A few suitable examples from this class are the formulas 1 (Cr 28S37N44.9I), 2 (Cr 22S28I), 3 (Cr 58I) and 4 (Cr 40N57I), as indicated in FIG. 5. These compounds decompose under the influence of UV radiation. The resultant decomposition products disturb the liquid-crystalline order. Radiation-dose indicators whose optically active layer comprises a tolyl compound in combination with liquid-crystalline cyanobiphenyl compounds proved to be very suitable. Two very suitable cyanobiphenyl compounds are shown in FIG. 5 in the formulas 5 (Cr21S33N40I) and 6 (Cr 14N28I). The abbreviations placed in parenthese denote the transition temperatures of the various liquid-crystalline phases, such as the crystalline (Cr) phase, the cholesteric (S) phase, the nematic (N) phase and the isotropic (I) phase.

Another preferred embodiment of the radiation-dose indicator is characterized in accordance with the invention in that a trans-isomer is used as the radiation-sensitive compound, which is converted to the corresponding cis-isomer under the influence of radiation. It has been found that such a conversion of trans-isomers to cis-isomers strongly disturbs the molecular order of the liquid-crystalline material. The more or less rod-shaped structure of the trans-isomer better fits in with the liquid-crystalline order than the more or less banana-shaped structure of the corresponding cis-isomer. In the case of these cis/transisomers, the point of time at which the indicator change takes place can be checked more accurately than in the case of the above-mentioned compounds which decompose under the influence of radiation.

A class of radiation-sensitive trans-isomers which can very advantageously be used in the indicators in accordance with the invention has a chemical structure in accordance with formula 7 in FIG. 5. In this formula, A and/or B stand(s) for the substituents $C_nH_{2n+1}$—, $C_nH_{2n+1}O$—, $C_nH_{2n+1}$—Ph —(Ph is phenyl), $C_nH_{2n+1}O$—Ph—, $C_nH_{2n+1}$—Hx—(Hx is cyclohexyl), $C_nH_{2n+1}O$—Hx—, $C_nH_{2n+1}$—Ph—C(O)O— Ph—, $C_nH_{2n+}$—Ph—C(O))—, $C_nH_{2n+1}O$—Ph—C(O)O—, $C_nH_{2n+1}O$—Ph—C(O)O—Ph— or $C_nH_{2n+1}CH(CH_3)$—$(CH_2)_mO)$—, wherein n=1–12 and m=0–6. A may be equal to B. A and/or B may alternatively stand for a chlorine group or a cyano group. X and Y stand for the groups C(H), $C(CH_3)$, C(Cl), C(CN) or N. X may be equal to Y.

The aromatic rings of this class of compounds, which are coupled by the unsaturated X—Y bond, undergo isomerization from the trans-compound to the cis-compound under the influence of radiation in the incident absorption band of the trans-compound. This absorption band should therefore be in the portion of the spectrum of which the radiation dose is measured.

Another preferred embodiment of the indicator is characterized in accordance with the invention in that the liquid-crystalline material as well as the radiation-sensitive compound are dispersed in an isotropic polymeric matrix. A material of this composition is customarily referred to as a PDLC-material (Polymer Dispersed Liquid Crystal). As the liquid-crystalline material mixes poorly with the matrix, the liquid-crystalline material comprising the radiation-sensitive compound is present in the optically active layer in the form of small droplets which are surrounded by the isotropic polymeric matrix. The use of a PDLC-layer instead of an optically active layer, which is mainly composed of liquid-crystalline material, has some important advantages. For example, the PDLC material in the indicator in accordance with the invention is cheaper because less liquid-crystalline material is needed. Moreover, in this embodiment the optically active layer can be manufactured so as to be a self-supporting layer.

Isotropic polymers which can suitably be used as a matrix material have a refractive index which is substantially equal to that of the liquid-crystalline material in the isotropic state. Aromatic polymers such as polystyrene and polycarbonate, which can be processed from the melt or from solution proved to be very suitable. The most interesting matrix polymers, however, are thermocuring formulations such as epoxies or photo-curing formulations such as polyfunctional (meth)acrylates. By a good choice of the monomers, the refractive index of the matrix can be made equal to that of the isotropic liquid-crystalline material. An additional advantage of the use of polyfunctional monomers is that the optically active layer manufactured with said polymers has a good mechanical stability. The ratio (measured in wt. %) between the quantity of liquid-crystalline material and the quantity of isotropic polymer in the optically active layer preferably ranges between 0.5 and 2. The optimum ratio is approximately 1.

A further preferred embodiment of the indicator in accordance with the invention is characterized in that the molecules of the liquid-crystalline material form part of a polymeric structure via covalent bonds. In combination with a radiation-sensitive compound, this so-called "liquid-crystalline polymer" can form the optically active layer. However, the polymer and the compound are preferably dispersed in an isotropic polymeric matrix. This combination is commonly referred to as PDLCP (Polymer Dispersed Liquid Crystal Polymer). As the liquid-crystalline groups are linked to a polymer via covalent bonds, these groups cannot readily escape from the optically active layer, for example by evaporation or exudation. This problem occurs, in particular, when the indicators are used at high temperatures, for example when they are provided on the transparent envelope of a lamp.

If the indicator of this embodiment comprises an optically active layer of PDLCP-material, the material of the polymeric structure must meet a few requirements. It must be immiscible or poorly miscible with the material of the isotropic polymeric matrix. In addition, the refractive index of the material of the polymeric structure in the isotropic phase should be approximately equal to that of the isotropic polymeric matrix. It is noted emphatically, however, that the effect of the inventive measure of this embodiment is also attained if the optically active layer comprises exclusively, or substantially exclusively, liquid-crystalline material and a radiation-sensitive compound.

A further interesting embodiment of the radiation-dose indicator in accordance with the invention is characterized in that the molecules of the radiation-sensitive compound form pan of the polymeric structure via covalent bonds. By virtue of this measure, it is precluded that the radiation-sensitive compound is exuded from the optically active layer. This leads to a further increase of the accuracy and reliability of the indicator in accordance with the invention.

Preferably, siloxanes are used as the material for the polymeric structure. An important advantage of siloxanes over many other polymers is that they exhibit a good thermal and mechanical stability and hence ageing takes place relatively slowly. The liquid-crystalline groups and, if applicable, the radiation-sensitive compounds are preferably linked to the polymeric structure as side groups. This leads to an increased mobility of these groups and hence to an increased sensitivity of the change of the indicator. If a linear siloxane is used, the polymeric structure preferably comprises 5 to 100 monomeric units. In this range the properties of the polymeric structure are optimal. If, however, a cyclic siloxane is used, then the polymeric structure should preferably comprise 3 to 7 monomeric units to attain optimum properties.

A user-friendly and hence very preferred embodiment of the indicator in accordance with the invention is characterized in that the optically active layer is applied to a colored substrate and in that the optically active layer comprises a dye which contrasts with the color of the substrate. This embodiment makes it possible to use any desired color combination instead of the combination white/transparent. Before the indicator change takes place, the color of the optically active layer dominates, whereas after said change of the indicator the color of the substrate will dominate. The substrate does not have to be uniform in color. It is alternatively possible to use a transparent substrate which is provided with a colored text or colored characters. This text or these characters become visible after the indicator has received the intended amount of radiation.

The invention also relates to a lamp. This lamp is characterized in that it is provided with a radiation-dose indicator as described hereinabove. Said lamp can be a discharge lamp, in which a discharge arc is generated between electrodes in a discharge tube during operation of the lamp. Examples of such lamps are high-pressure discharge lamps, such as high-pressure Na, Hg or metal-halide lamps, or low-pressure discharge lamps such as fluorescent lamps or low-pressure Na lamps. In this case, the indicator may be secured to said discharge tube. However, the lamp may alternatively be an incandescent lamp comprising an incandescent body in a vacuum envelope. The envelope can be evacuated contain a filler gas. Said filler gas may be inert or based on a halogen gas. Halogen lamps are a good example of the latter lamp type. In this case the indicator may be provided on the lamp envelope.

The invention also relates to a tanning apparatus. Said apparatus is characterized in that it comprises a radiation-dose indicator as described hereinabove. Said indicator is provided on a part of the apparatus which, during operation of the apparatus, is not covered by the body of the user.

BRIEF DESCRIPTION OF THE DRAWINGS

These and other aspects of the invention will be apparent from and elucidated with reference to the embodiments described hereinafter.

In the drawings.

It is noted that, for clarity, the various parts of the Figures are not drawn to scale.

DETAILED DESCRIPTION OF THE PREFERRED EMBODIMENTS

Figure 1A:
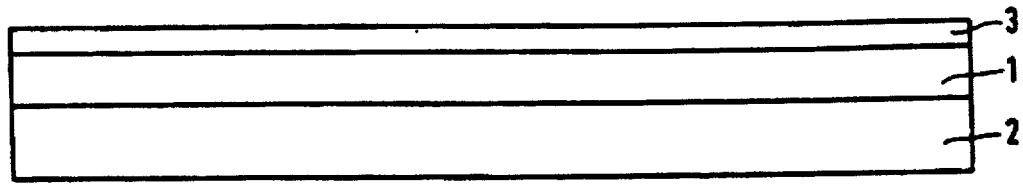
FIG. 1A and FIG. 1B are schematic, sectional views of a number of embodiments of a radiation-dose indicator in accordance with the invention.
Figure 1B:
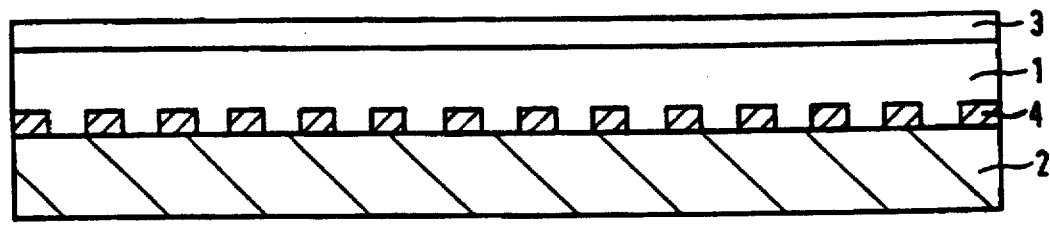

FIG. 1-A is a schematic, sectional view of a first embodiment of a radiation-dose indicator in accordance with the invention. This radiation-dose indicator comprises an optically active layer 1 which is provided on a substrate 2. In the embodiment shown, the optically active layer is provided with a protective coating 3 to preclude damage to the optically active layer. However, said protective coating 3 is not necessary for the proper functioning of the indicator in accordance with the invention.

For the substrate use can be made of glass or another inorganic material. It is alternatively possible, however, to use a flexible synthetic resin for the substrate. This is preferred, in particular if the indicator must be provided on an uneven substrate. If the radiation to be measured is directed via the substrate to the optically active layer then the substrate must be transparent to this radiation. It is noted that the presence of the substrate is not necessary for the proper functioning of the indicator in accordance with the invention. This applies in particular if the optically active layer is strong enough to be used as a self-supporting layer. In this case, after its manufacture, the optical layer is removed from the substrate.

The optically active layer comprises a material having a liquid-crystalline order. Said liquid-crystalline material may exhibit nematic, cholesteric or smectic properties. Owing to this liquid-crystalline order the layer is opaque. In the absence of a dye in the layer, it will have a whitish (opaque) appearance. The layer also comprises a radiation-sensitive compound which breaks the liquid-crystalline order after the conversion process. This causes the liquid-crystalline material to become isotropic and hence transparent.

Figure 5:
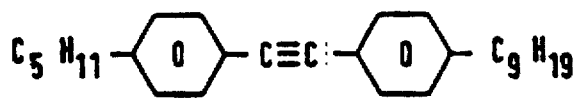
FIG. 5 shows formulas of optically active materials suitable for use in the radiation-dose indicator of the invention.
Figure 5:
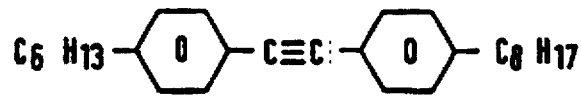
Figure 5:
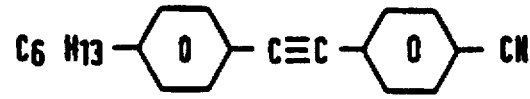
Figure 5:
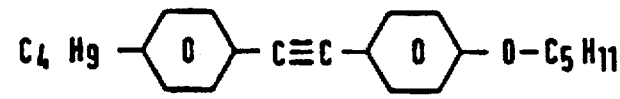
Figure 5:
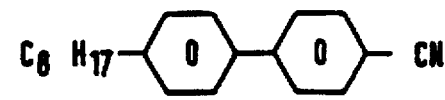
Figure 5:
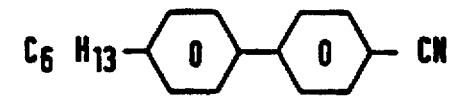
Figure 5:
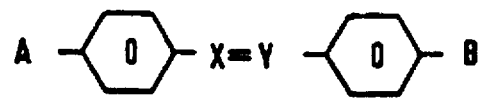
Figure 5:
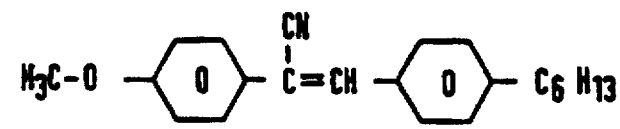
Figure 5:
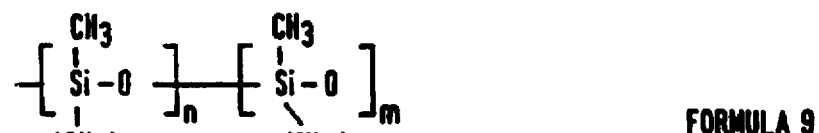
Figure 5:
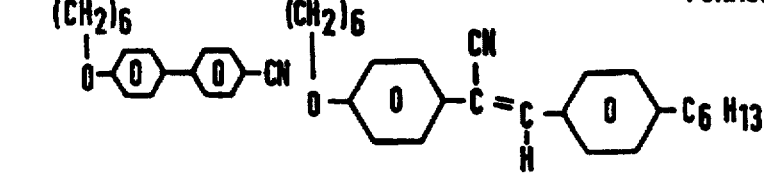

The radiation-dose indicator in accordance with FIG. 1-A was manufactured as follows. Two transparent synthetic resin foils of polyethylene terephthalate were positioned at a short distance from each other by means of spacers. Subsequently, a thin, optically active layer was provided between the foils by means of capillary filling. This layer was composed of a mixture of 50 wt. % tolane in accordance with formula 1 of FIG. 5 and 50 wt. % of the cyanobiphenyl compound in accordance with formula 5 of FIG. 5. The first foil serves as the substrate. The second foil serves as a covering layer to preclude evaporation of the liquid-crystalline molecules. The indicator thus obtained changed after an accumulated radiation dose of approximately $2.10^4$ $J/cm^2$.

FIG. 1-B shows a second embodiment of the indicator in accordance with the invention. This indicator comprises an optically active layer 1, a substrate 2 of glass and a protective coating 3 consisting of a glued-on synthetic resin foil. A small quantity of a dye is provided in the optically active layer. A fine lattice structure 4 of red colored material is provided between the optically active layer and the substrate. The apertures in the lattice serve to guide radiation to the optically active layer via the substrate. In the anisotropic phase, the color of the dye predominates in the indicator. After the radiation-sensitive conversion has taken place to a sufficient degree, this color disappears and the red color of the lattice becomes predominant.

The indicator shown in FIG. 1-B was manufactured as follows. A glass substrate was provided over a surface area of 5 by 20 mm with a 5 micrometers thick layer in the desired lattice structure by means of a printing technique. The material of the lattice was composed of a bisphenol-A/amine-epoxy system which cures at room temperature and in which 5 wt. % of a red pigment were dispersed. The adhesion to glass proved to be satisfactory. In addition, the lattice did not flow during the curing operation.

An optically active layer was applied to the lattice. This layer was composed of a mixture of 50 wt. % of a bisphenol A epoxy, namely EPO-Tek 301-2 available commercially from Epoxy Technology Inc.), 35 wt. % of the liquid-crystalline mixture E7 available commercially from Epoxy, and 15 wt. % of the trans-cyanostilbene in accordance with the structural formula 8 shown in FIG. 5. This layer was spread as a wet film on the substrate with the lattice. Subsequently, the optically active layer was cured by subjecting it to a temperature of 80° C. for 3 hours or to room temperature for 3 days. Finally, a thin transparent coating was applied to the optical layer to protect said optical layer against contact. The indicator thus manufactured turned from white to red after it had been exposed to radiation having an energy of 5400 $J/cm^2$.

A third embodiment of the indicator in accordance with the invention was produced as follows. An optically active layer was spread from the melt on a flexible polyester substrate. This optically active layer was composed of the copolymer referred to as structure 9 in FIG. 5. This copolymer comprises the same active constituents as the optically active layer described in the second embodiment. The layer described in this embodiment, however, has a higher mechanical stability and is less subject to ageing. To obtain an optimally functioning indicator, the ratio of m:n must be approximately 1:5. In view of the processing of the polymer, the degree of polymerization (m+n) ranges between 5 and 100. Cyclic siloxanes can alternatively be used instead of linear polymers. Under these conditions the degree of polymerization must range between 3 and 7 in order to combine a low degree of evaporation of the liquid-crystalline materials with a sufficiently rapid switching time.

A fourth embodiment of the indicator in accordance with the invention was produced as follows. The copolymer described in embodiment 3 was dispersed in isotropic bisphenol-A epoxy. The starting material used was composed of 50 wt. % of the copolymer and 50 wt. % of the isotropic polymer. A quantity of 2 wt. % of the blue dye M-843 AQ (available commercially from Mitsui Toats) was added to this mixture. The "polymer dispersed liquid crystal polymer" (PDLCP) thus obtained was spread on a red substrate and cured. Owing to the liquid-crystalline order of the copolymer the indicator had a blue appearance. After prolonged exposure of the indicator to radiation having a wavelength of 360 nm, the liquid-crystalline order was broken and said indicator assumed the color of the underlying, contrasting red substrate.

Figure 2:
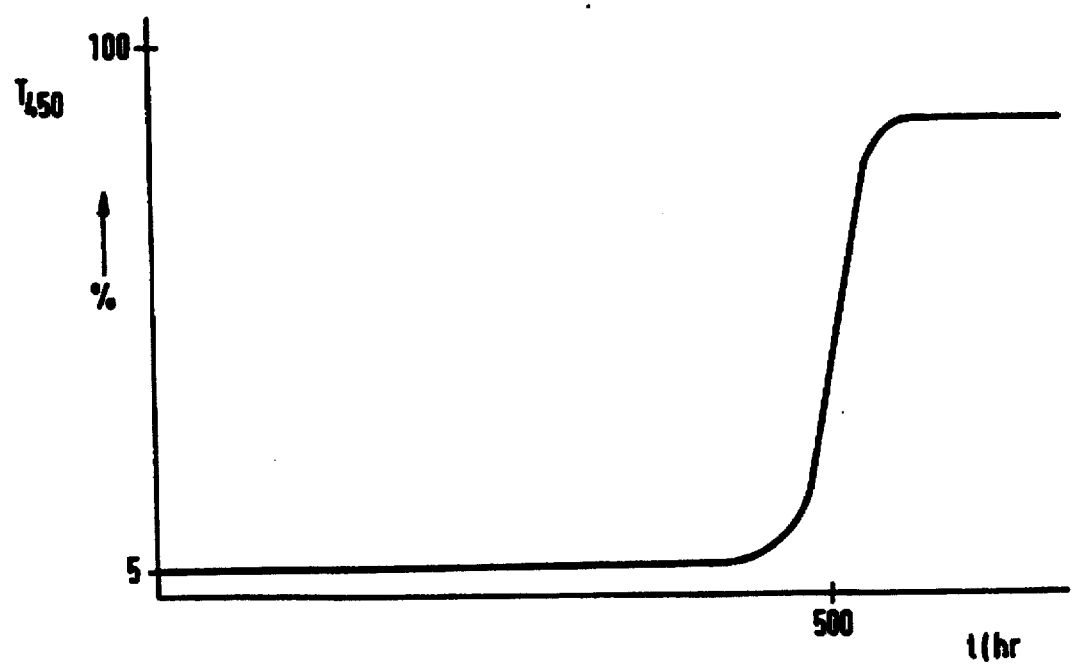
FIG. 2 shows a graph in which the transmission of an inventive radiation-dose indicator is plotted as a function of time at a fixed wavelength.

FIG. 2 shows a graph in which the transmission (T in %) of the inventive indicator in accordance with the fourth embodiment is plotted as a function of time. The transmission was measured at 450 nm. During the first 450 hours the transmission remains stable at a low level (approximately 5%). Subsequently, a rapid increase to the transmission to a maximum value of approximately 85% occurs. In reality, a color change from blue to red took place.

Figure 3A:
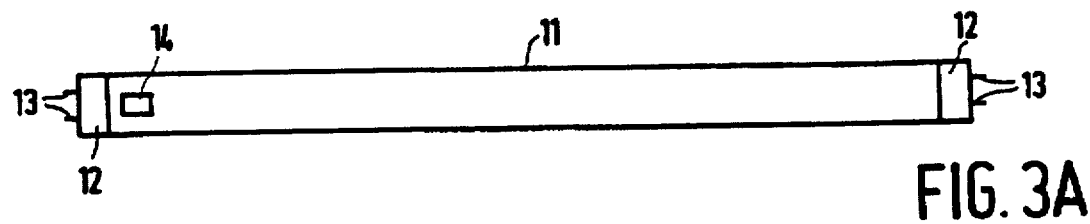
FIG. 3A and FIG.3B show two lamps comprising a radiation-dose indicator in accordance with the invention.
Figure 3B:
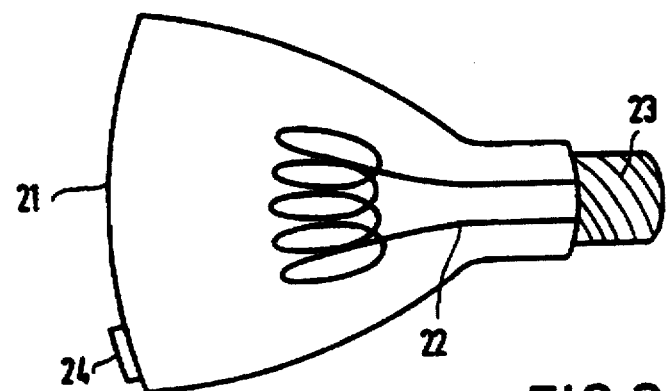

FIG. 3 shows two lamps which are provided with an indicator in accordance with the invention. The lamp shown in FIG. 3-A is a gas-discharge lamp. The lamp shown in FIG. 3-B is an incandescent lamp. The lamp of FIG. 3-A comprises a tubular envelope 11 which is provided at the ends with closures 12 with electrical connection contacts 13. A radiation-dose indicator 14 is provided on the envelope. The color and/or transparency of this indicator changes after a certain number of burning hours of this gas-discharge lamp. The indicator is very advantageously used in discharge lamps emitting UV-light.

FIG. 3-B shows an incandescent lamp comprising a glass envelope 21, a filament 22 and an electrical connection 23. A radiation-dose indicator 24 is provided on the envelope. The color and/or transparency of this indicator changes after a certain number of burning hours of the lamp. The indicator is very advantageously used in incandescent lamps emitting IR light.

Figure 4:
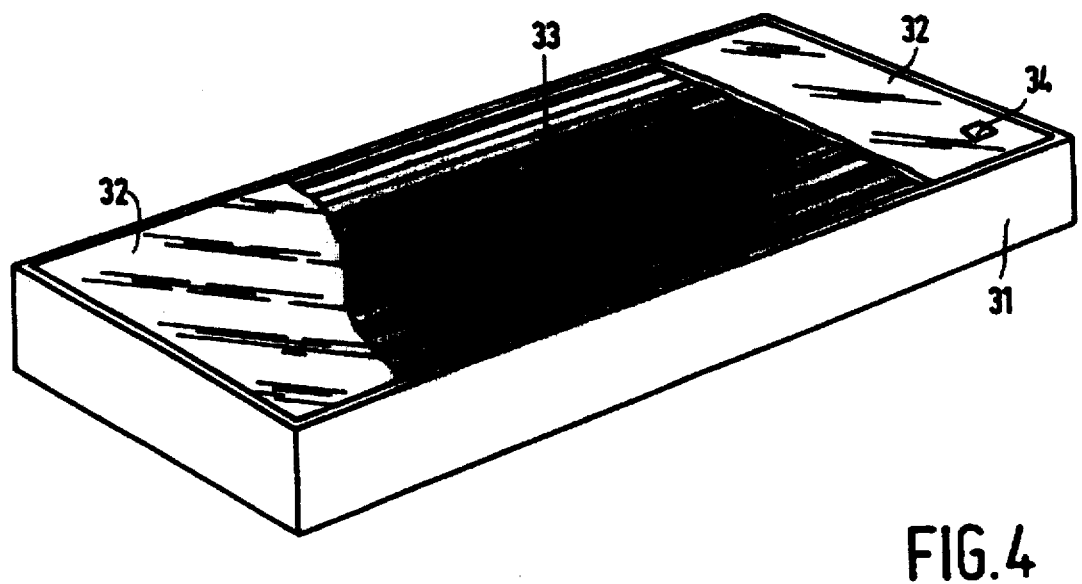
FIG. 4 shows a tanning apparatus comprising a radiation-dose indicator in accordance with the invention.

FIG. 4 is a partly cutaway view of a tanning apparatus comprising a radiation-dose indicator. Said apparatus comprises a box-shaped housing 31 which is provided at a main surface with a cover plate 32. This plate is transparent to ultraviolet radiation of a wavelength above 315 nm (UV-A radiation). This radiation is generated by a number of parallel, tubular low-pressure mercury discharge lamps 33. The cover plate 32 is provided with an exchangeable radiation-dose indicator 34. After a number of operating hours of the tanning apparatus, the color and/or transparency of the indicator changes. This indicates that a certain amount of radiation has been emitted. This change may indicate that a user has received, during one or more periods of use, a certain amount of radiation. Said change may alternatively indicate, however, that the lamps of the apparatus must be replaced.

The present invention provides a reliable and accurate radiation-dose indicator which is relatively cheap to manufacture. The indicator is based on an optically active layer which comprises liquid-crystalline material in combination with a radiation-sensitive compound. The conversion product of the radiation-sensitive compound changes the order of the liquid-crystalline material. This change can be visually observed. The inventive indicator can very advantageously be used in UV and IR lamps as well as in tanning apparatus.

We claim:

1. A radiation-dose indicator comprising an optically active layer, wherein said optically active layer includes a liquid-crystalline material and a radiation-sensitive compound which is converted under the influence of radiation in such a manner as to change the order of the liquid-crystalline material, the optically active layer exhibiting a liquid-crystalline order which is broken after conversion of the radiation-sensitive compound.

2. A radiation-dose indicator as claimed in claim 1, wherein a trans-isomer is used as the radiation-sensitive compound, which is converted to the corresponding cis-isomer under the influence of radiation.

3. A radiation-dose indicator as claimed in claim 2 wherein the liquid-crystalline material and the radiation-sensitive compound are dispersed in an isotropic polymeric matrix.

4. A radiation-dose indicator as claimed in claim 2, wherein the molecules of the liquid-crystalline material form part of a polymeric structure via covalent bonds.

5. A radiation-dose indicator as claimed in claim 3, wherein the optically active layer is applied to a colored substrate and the optically active layer comprises a dye which contrasts with the color of the substrate.

6. A radiation-dose indicator as claimed in claim 1, wherein the liquid-crystalline material as well as the radiation-sensitive compound are dispersed in an isotropic polymeric matrix.

7. A radiation-dose indicator as claimed in claim 6, wherein the molecules of the liquid-crystalline material form part of a polymeric structure via covalent bonds.

8. A radiation-dose indicator as claimed in claim 6, wherein the optically active layer is applied to a colored substrate and the optically active layer comprises a dye which contrasts with the color of the substrate.

9. A radiation-dose indicator as claimed in claim 1 wherein the molecules of the liquid-crystalline material form part of a polymeric structure via covalent bonds.

10. A radiation-dose indicator as claimed in claim 9, wherein the molecules of the radiation-sensitive compound form part of the polymeric structure via covalent bonds.

11. A radiation-dose indicator as claimed in claim 10, wherein a siloxane is used as the polymeric structure.

12. A radiation-dose indicator as claimed in claim 10, wherein the optically active layer is applied to a colored substrate and the optically active layer comprises a dye which contrasts with the color of the substrate.

13. A radiation-dose indicator as claimed in claim 9 wherein a siloxane is used as the polymeric structure.

14. A radiation-dose indicator as claimed in claim 13, wherein the optically active layer is applied to a colored substrate and the optically active layer comprises a dye which contrasts with the color of the substrate.

15. A radiation-dose indicator as claimed in claim 9, wherein the optically active layer is applied to a colored substrate and the optically active layer comprises a dye which contrasts with the color of the substrate.

16. A radiation-dose indicator as claimed in claim 1, wherein the optically active layer is applied to a colored substrate and the optically active layer comprises a dye which contrasts with the color of the substrate.

17. A lamp comprising a housing a light source, an electrical connection, and a radiation-dose indicator as claimed in claim 1.

18. A tanning apparatus comprising a housing, a radiation source, and a radiation-dose indicator as claimed in claim 1.

19. A lamp comprising a housing, a light source, an electrical connection, and a radiation-dose indicator as claimed in claim 2, wherein the optically active layer is applied to a colored substrate and the optically active layer comprises a dye which contrasts with the color of the substrate.

20. A lamp comprising a housing, a light source, an electrical connection, and a radiation-dose indicator as claimed in claim 6, wherein the optically active layer is applied to a colored substrate and the optically active layer comprises a dye which contrasts with the color of the substrate.

21. A lamp comprising a housing, a light source, an electrical connection, and a radiation-dose indicator as claimed in claim 9, wherein the optically active layer is applied to a colored substrate and the optically active layer comprises a dye which contrasts with the color of the substrate.

22. A lamp comprising a housing, a light source, an electrical connection, and a radiation-dose indicator as claimed in claim 10, wherein the optically active layer is applied to a colored substrate and the optically active layer comprises a dye which contrasts with the color of the substrate.

23. A lamp comprising a housing, a light source, an electrical connection, and a radiation-dose indicator as claimed in claim 13, wherein the optically active layer is applied to a colored substrate and the optically active layer comprises a dye which contrasts with the color of the substrate.

24. A lamp comprising a housing, a light source, an electrical connection, and a radiation-dose indicator as claimed in claim 16, wherein the optically active layer is applied to a colored substrate and the optically active layer comprises a dye which contrasts with the color of the substrate.

25. A tanning apparatus comprising a housing, a radiation source, and a radiation-dose indicator as claimed in claim 2, wherein the optically active layer is applied to a colored substrate and the optically active layer comprises a dye which contrasts with the color of the substrate.

26. A tanning apparatus comprising a housing, a radiation source, and a radiation-dose indicator as claimed in claim 6, wherein the optically active layer is applied to a colored substrate and the optically active layer comprises a dye which contrasts with the color of the substrate.

27. A tanning apparatus comprising a housing, a radiation source, and a radiation-dose indicator as claimed in claim 9, wherein the optically active layer is applied to a colored substrate and the optically active layer comprises a dye which contrasts with the color of the substrate.

28. A tanning apparatus comprising a housing, a radiation source, and a radiation-dose indicator as claimed in claim 10, wherein the optically active layer is applied to a colored substrate and the optically active layer comprises a dye which contrasts with the color of the substrate.

29. A tanning apparatus comprising a housing, a radiation source, and a radiation-dose indicator as claimed in claim 13, wherein the optically active layer is applied to a colored substrate and the optically active layer comprises a dye which contrasts with the color of the substrate.

30. A tanning apparatus comprising a housing, a radiation source, and a radiation-dose indicator as claimed in claim 16, wherein the optically active layer is applied to a colored substrate and the optically active layer comprises a dye which contrasts with the color of the substrate.

\* \* \* \* \*